3,009,924
DYESTUFFS OF THE AURAMINE SERIES WHICH ARE SOLUBLE IN ALCOHOLS
Fritz Schubert and Emil Kern, Ludwigshafen (Rhine), Germany, assignors to Badische Anilin- & Soda-Fabrik Aktiengesellschaft, Ludwigshafen (Rhine), Germany
No Drawing. Filed Jan. 14, 1958, Ser. No. 708,770
Claims priority, application Germany Jan. 22, 1957
1 Claim. (Cl. 260—396)

This invention relates to the production of dyestuffs of the auramine series which have a good solubility in alcohols and to new dyestuffs of the auramine series which have a good solubility in alcohols.

The dyestuffs of the auramine series generally come into commerce in the form of hydrochlorides. In this form they are readily soluble in water but only moderately soluble in alcohols and lacquers. They are therefore not suitable for example for the production of phlexographic printing colours. It is therefore an object of the present invention to provide new dyestuffs of the auramine series of which the good solubility in alcohols and lacquers makes them suitable for the production of phlexographic printing colours and similar products.

Phlexographic printing colours are colours which are printed onto a substrate, for example paper, with the aid of rubber rollers. For this purpose the dyestuffs are dissolved in alcohols which preferably contain up to 6 carbon atoms in the molecule.

We have now found that dyestuffs of the auramine series which have a good solubility in alcohols and which are eminently suitable for the colouring of lacquers and for the production of phlexographic printing colours are obtained by reacting a water-soluble salt of an auramine dyestuff with a water-soluble salt of a nitrogen oxyacid. There are thereby formed the hitherto unknown, well crystallising salts of auramine dyestuffs of the general formula $A^{\oplus} X^{\ominus}$ in which $X^{\ominus}$ is the anionic radical of a nitrogen oxyacid, such as the monobasic $NO_3$— and $NO_2$— in which anions the nitrogen has a positive valency of V and III, respectively, and $A^{\oplus}$ represents the cationic radical of a salt of an auramine dyestuff, such as the cationic radical of Auramine O of the formula I
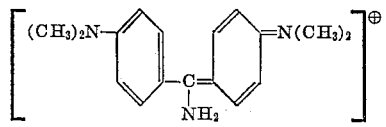

and the cationic radical of Auramine G of the formula

II
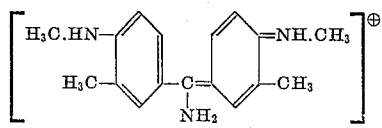

As water-soluble salts of nitrogen oxyacids, such as monobasic nitrogen oxyacids, there may be mentioned for example the alkali or alkaline earth salts of nitric acid or nitrous acid, such as sodium, potassium, ammonium or calcium nitrate or sodium, potassium or barium nitrite, and as water-soluble salts of auramine dyestuffs there may be mentioned for example the hydrochlorides of auramine dyestuffs, such as Auramine O (Schultz, Farbstofftabellen 1931, No. 752 or Colour Index 1956, 2nd edition, 1st volume, page 1619, No. 41,000) or Auramine G (Schultz, Farbstofftabellen, 1931, No. 753 or Colour Index 1956, 2nd edition, 1st volume, page 1620, No. 41,005).

It is preferable to work by dissolving the water-soluble auramine salt, for example the hydrochloride or the sulfate, at about 50° to 70° C. in the necessary amount of water or a small excess of water and then introducing the amount of a water-soluble nitrite or nitrate, for example sodium nitrite or potassium nitrate, which is necessary for the most complete possible precipitation of the dyestuff nitrite or nitrate. The necessary amount can easily be ascertained by preliminary test and amounts to from about one third to about double the amount of the auramine salt used.

The solutions obtained in the technical production of auramine hydrochloride by dissolving or melting in water may for example be used directly as initial material. However, it is also possible first to precipitate the auramine hydrochloride from the solutions in the usual way by the addition of sodium chloride and to dissolve the dyestuff, filtered off by suction, in water before or after it has been dried.

The salts obtained from the solutions of auramine hydrochlorides by precipitation with water-soluble salts of nitrogen oxyacids are well crystallised. Surprisingly they dissolve very well in alcohols even at room temperature, for example in alcohols which contain up to 6 carbon atoms in the molecule, such as methanol, ethanol, glycols, diethylene glycol or diethylene glycol monoethyl ether, and in lacquers, and they are therefore eminently suitable, among other things, for the production of phlexographic printing colours.

A further advantage of the new auramine salts is that they contain practically no sulfur which is capable of being reduced by metals to hydrogen sulfide, such as in general adheres to technical auramine hydrochlorides from their production. Apparently it is oxidised by the anions of the nitrogen oxyacids. Lacquers which are coloured with the new auramine salts can therefore be stored in galvanised tins without hydrogen sudfide being developed or readily reducible dyestuffs which are present at the same time being attacked.

It was not immediately to be foreseen that the salts of auramine dyestuffs with nitrogen oxyacids would be stable and that no mutual oxidation and reduction would occur between cation and anion.

The new dyestuffs may be used for example by dissolving them in alcohols, which preferably contain up to 6 carbon atoms in the molecule, and printing them with rubber rollers onto substrates, for example paper.

The following examples will further illustrate this invention but the invention is not restricted to these examples. The parts specified in the examples are parts by weight.

*Example 1*

70 parts of sodium nitrate are added at 65° C. while stirring to 5,000 parts of a saturated aqueous solution of Auramine O (Schultz, Farbstofftabellen, 1931, No. 752 or Colour Index 1956, 2nd edition, 1st volume, page 1619, No. 41,000). The new dyestuff is precipitated at once in a finely crystalline form. After cooling to 35° C., it is filtered off by suction and dried at about 80° C. (melting point 201° to 202° C.). The yield amounts to 139 parts. The dyestuff dissolves even in the cold in ten times its weight of ethanol.

The equivalent amount of potassium, calcium or ammonium nitrate may be used instead of the sodium nitrate.

*Example 2*

100 parts of Auramine G (Schultz, Farbstofftabellen, 1931, No. 763, or Colour Index 1956, 2nd edition, 1st volume, page 1620, No. 41,005) are stirred into 8,000 parts of water at 25° to 40° C. The whole is heated at 70° C. until all has dissolved and then 175 parts of sodium nitrate are introduced, the new dyestuff being precipitated at once. 80 parts of a dyestuff are obtained which dissolves very well in alcohols. The melting point of the dyestuff is 125° to 128° C.

*Example 3*

140 parts of sodium nitrite are added with stirring to 5,000 parts of the solution of Auramine O specified in Example 1 at 70° C. The new dyestuff is precipitated at once in the form of long needles. It is filtered off by suction after cooling to about 30° C. and dried at 80° C. (melting point 133° to 134° C.). The yield amounts to 141 parts. The dyestuff dissolves very well in alcohols.

The equivalent amount of potassium or barium nitrite can be used instead of sodium nitrite.

*Example 4*

50 parts of the Auramine G specified in Example 2 are dissolved rapidly in 4,000 parts of water at 50° to 60° C. and if necessary filtered. 40 parts of sodium nitrite are immediately added to the solution, the new dyestuff thereby being precipitated in crystalline form. The reaction mixture is allowed to cool while stirring and the dyestuff is filtered off by suction and dried. A dyestuff is obtained in a good yield. It is of very good solubility in alcohols. The dyestuff melts at about 122° to 132° C.

What we claim is:

A process for the production of an auramine dyestuff which has good solubility in alcohols which comprises adding a water-soluble salt selected from the group consisting of alkali, alkaline earth and ammonium nitrates and nitrites to an aqueous solution of a water-soluble salt in which the cation is a member selected from the group consisting of

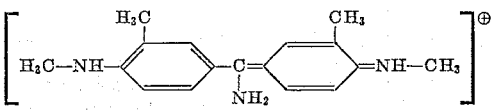

and

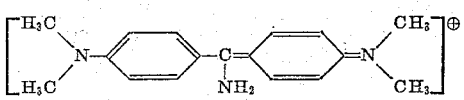

and the anion is a member selected from the group consisting of chlorine and sulfate, and separating from the aqueous medium the resulting auramine dyestuff precipitate.

References Cited in the file of this patent

Semper: Annalen der Chemie, vol. 381, p. 249 (1911).
Ephraim: Inorganic Chemistry, Interscience Publishers etc., 6th edition (1954), pp. 713–715, 730.
Galinowski et al.: Journal of the Chemical Soc., 1948, p. 2169.
Beilstein, Handbuch der Organischen Chemie, 4th ed., vol. 14, pp. 91–93 (1931 ed.).